United States Patent Office 3,699,024
Patented Oct. 17, 1972

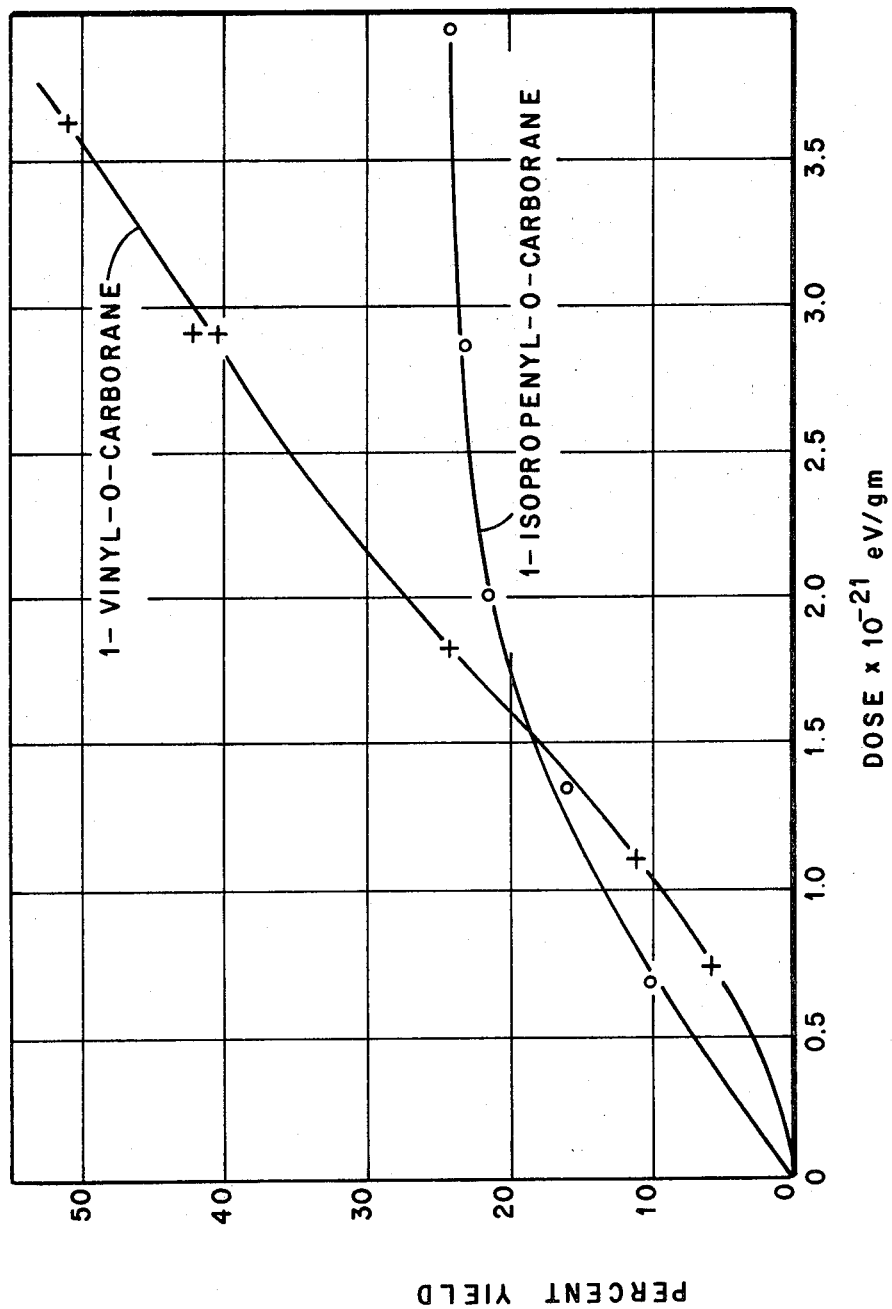

3,699,024
RADIATION POLYMERIZATION OF VINYL CARBORANES AND NOVEL PRODUCTS RESULTING THEREFROM
Theodore J. Klingen, Oxford, Miss., and John R. Wright, Batesville, Ark., assignors to the United States of America as represented by the United States Atomic Energy Commission
Filed Oct. 29, 1970, Ser. No. 85,003
Int. Cl. C08f 1/16, 1/24
U.S. Cl. 204—159.22
2 Claims

ABSTRACT OF THE DISCLOSURE

This invention relates to a method for forming an addition polymer from a vinyl carborane monomer which comprises irradiating said monomer with high-energy radiation in an oxygen-free atmosphere to a dose which will effect conversion of the monomer to a desired polymer, said monomer being selected from those described by the generic formula

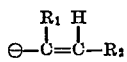

Figure 1:
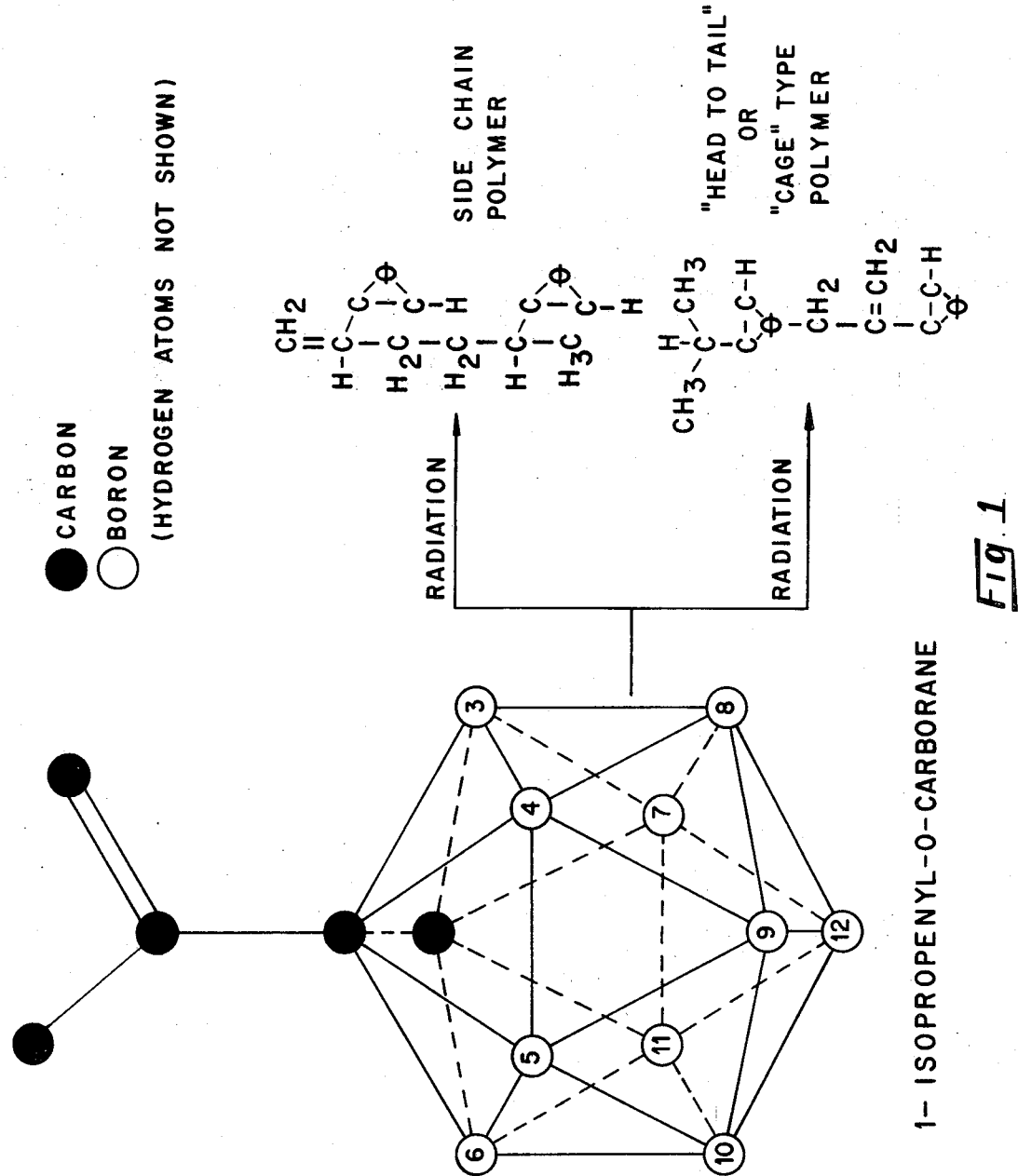

where $\ominus$ is the carborane cage structure wherein the vinyl group is attached to one of the carbons in the carborane cage, $R_1$ is H or $CH_3$, and $R_2$ is H or an alkyl group, and to the polymers resulting therefrom.

---

The invention described herein was made in the course of, or under, a contract with the U.S. Atomic Energy Commission.

SUMMARY OF THE INVENTION

The present invention relates to novel organoboron polymers and to a method for their preparation. More particularly, the invention relates to a radiation-induced polymerization of vinyl carboranes to produce a unique series of polymeric products ranging from the dimer, trimer, tetramer, and pentamer to a polymeric product having a molecular weight corresponding to as much as 20 monomer unit chains of the monomer.

The class of novel polymers within the scope of this invention are derived from vinyl carboranes having the generic formula

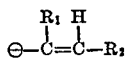

where $\ominus$ is the carborane cage shown in full in FIG. 1 wherein the vinyl grouping is attached to either carbon of the carborane cage; $R_1$ is H or $CH_3$, and R is H or a saturated or unsaturated alkyl group. Where $R_1$ and $R_2$ are both H, the compound is 1-vinyl-o-carborane; where $R_1$ is $CH_3$ and $R_2$ is H, the compound is 1-isopropenyl-o-carborane; and in the ensuing description we will refer to these compounds as representative embodiments of the invention.

The polymeric products of this invention are, repeating, definite units of the monomer which can be identified and separated as dimer, trimer, tetramer, pentamer up to as many as 20 monomeric units in length. The radiolysis of this class of compounds produces at least two main types of polymeric linkage. In the case of 1-vinyl-o-carborane, polymerization occurs almost exclusively between the vinyl side chain of one monomer and the 9 or 12 boron cage position of another monomer molecule with the retention of a vinyl-type end group. In the case of 1-isopropenyl-o-carborane, polymerization proceeds to form the "cage"-type polymer, but, in addition, we experimentally deduce a "side chain" polymer structure in which polymerization takes place through the side chains of two monomers and retains a vinyl-type end group, but not in the chain connecting the monomeric units. In FIG. 1 we show the two types of dimer structure as represented by the dimerization of 1-isopropenyl-o-carborane.

The polymer products of this invention are unique in that they retain an unsaturated or vinyl-type linkage capable of undergoing reaction characteristics of these forms of unsaturation to be bound chemically to other materials to impart the heat-stable characteristic of the carborane cage to the resultant compound or composition. The polymers also have independent utility as heat-stable compounds having high heats of combustion and as such are useful as components in solid propellant compositions.

From a process point of view, the present invention is unique in that it represents a radiation polymerization synthesis which, to our knowledge, has no chemical counterpart process for producing the same product.

The following procedure describes a typical procedure for carrying out the method of our invention:

Radiolysis of 1-vinyl-o-carborane and 1-isopropenyl-o-carborane was carried out on carefully degassed samples of purified material sealed under vacuum in Pyrex reaction vessels. Degassing is essential as oxygen inhibits the reaction.

Purification of the starting materials was effected by vacuum sublimation. Purity checks were accomplished by using thin-layer chromatography and gas chromatography without any indication in either case of a volatile or nonvolatile impurity. Vacuum sublimation of the vinyl carborane resulted in a material which was crystalline at 0° C. but which, on warming to room temperature, reverted to a waxy state. Differential thermal analysis of 1-vinyl-o-carborane revealed a large endothermic peaking at 11° C. and a melting point of 79° C. This showed that we were dealing with a material that was crystalline below about 11° C., in a waxy or mesomorphic state above 11° C., and liquid at a temperature of 79° C. and above. On the other hand, vacuum sublimation of 1-isopropenyl-o-carborane resulted in a crystalline product which remained crystalline at and above room temperature, with a melting point of 47° C. The thus purified materials were irradiated with a cobalt-60 source at temperatures ranging from 5° to about 200° C.

RESULTS OF VINYL CARBORANE RADIOLYSIS

After irradiation, the only product found was a solid material. Separation of the solid product from the starting material was accomplished either by vacuum sublimation or by extraction with petroleum ether, in which the monomer is preferentially soluble. The vacuum-sublimation product was shown to be pure 1-vinyl-o-carborane by nuclear magnetic resonance and infrared spectroscopy as well as by melting point. The solid reaction product had a melting point greater than 400° C. The apparently polymeric product was found to be stable in air and water at room temperature. Heating in air for extended periods of time above 300° C. produced no detectable change in composition or structure. Mass spectral analysis of this solid product showed it to consist of monomer, dimer, trimer, tetramer, pentamer of 1-vinyl-o-carborane, as well as a higher molecular weight fraction, indicating polymerization to have taken place up to as much as 20 monomeric units. Quantitative separation of the various polymeric reaction products was effected by thin-layer chromatographic techniques.

By a combination of mass spectral analysis, ultraviolet and infrared spectral data as well as proton nuclear magnetic resonance spectra, it was concluded that the vinyl group entered into the radiolysis reaction in such a manner as to become saturated and that an adduct polymer was formed between a carbon of the vinyl group and the 9 or 12 position boron of another polyhedral carborane cage. $B^{11}$ nuclear magnetic resonance spectral analysis of a polymer showed substitution of the boron cage at either the 9 or 12 position.

The radiolysis of 1-isopropenyl-o-carborane gives rise to two different types of dimer, the structures of which are shown in FIG. 1. A comparison of the weight percent yield of the polymers of 1-vinyl-o-carborane and 1-isopropenyl-o-carborane is a function of radiation dose as shown in FIG. 2. In the case of the polymer, principally dimer, formed from 1-isopropenyl-o-carborane, the yield is somewhat similar to the case of 1-vinyl-o-carborane but begins to level off and reach a constant value at doses of about $2 \times 10^{21}$ ev./gram. The difference is due to the fact that the 1-vinyl-o-carborane polymerization continues beyond the dimer-trimer stage to form a longer-chain polymer. For example, in the 50-percent-conversion region we find in the case of 1-vinyl-o-carborane that the polymer is of the order of 11 to 12 units in length. With the same total dosage, the polymer from 1-isopropenyl-o-carborane is still only at the dimer-trimer stage.

In order to investigate the effect of the temperature on the radiation-induced polymerization of these monomers they were irradiated to a constant total dose of $1.25 \times 10^{21}$ ev./gram at several temperatures. The monomers were heated to the indicated temperature in the absence of radiation and it was found that when monomers were heated up to a temperature of 172° C. for 24 hours the monomer was completely unchanged. On the other hand, in the presence of radiation to the indicated dosage of $1.3 \times 10^{21}$ ev./gram, a number of interesting results were noted which are summarized in the table below.

TABLE.—TEMPERATURE DEPENDENCE OF POLYMER FORMATION

| Temperature, ° C. | State | 1-vinyl-o-carborane polymer, percent cage yield | 1-isopropenyl-o-carborane polymer Percent cage yield | Percent side chain yield |
| --- | --- | --- | --- | --- |
| 5 | Crystalline | 8.2 | | |
| 31 | do | | 15.3 | 30.3 |
| 31 | Mesomorphic | 20.0 | | |
| 108 | Liquid | 47.5 | 1.4 | 0.0 |
| 172 | do | 86.0 | 6.7 | 0.0 |

It will be noted that the percent yield of polymer from 1-vinyl-o-carborane increases with temperature from 5° C. to 172° C.; that is, through the crystalline, waxy or mesomorphic, and liquid states. Secondly, in the case of 1-isopropenyl-o-carborane, a drastic decrease in the yield of dimer of both types occurred in going from its crystalline to liquid state. Thus, the vinyl carborane polymer increases not only in yield but in molecular weight as the temperature is increased and as the monomer changes from crystalline to mesomorphic to the liquid state. On the other hand, the exact reverse is true in the case of the 1-isopropenyl-o-carborane reaction.

In the foregoing description and representative embodiments we utilize the ortho isomer of carborane to illustrate the polymerization process. It should be understood that it is within the scope of this invention to effect radiation-induced polymerization of other isomeric forms of vinyl carborane where the carbon atoms in the carborane cage are meta to each other; i.e., where the carbons are in the 1, 7 position, or where the carbons are para to each other; i.e., where the carbons are in the 1,12 position of the carborane cage.

Having described the invention in general terms, and with respect to specific embodiments, the following claims are made in accordance with the scope of the disclosed invention.

What is claimed is:

1. A method for forming a polymer from a vinyl carborane monomer which comprises irradiating said monomer with high-energy radiation in an oxygen-free atmosphere to a dose which will effect conversion of the monomer to a polymer, said monomer being selected from those described by the generic formula

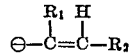

where $\ominus$ is the carborane cage wherein the vinyl group is attached to one of the carbons in the carborane cage, $R_1$ is H or $CH_3$, and $R_2$ is H.

2. The method according to claim 1 wherein the monomer is 1-vinyl-o-carborane.

References Cited

UNITED STATES PATENTS

| | | | |
| --- | --- | --- | --- |
| 3,373,001 | 3/1968 | Drinnard | 260—606.5 B |
| 3,463,820 | 8/1969 | Ager, Jr. et al. | 260—606.5 B |
| 3,499,926 | 3/1970 | Alexander et al. | 260—606.5 B |
| 3,269,992 | 8/1966 | Green et al. | 260—80 P |
| 3,440,260 | 4/1969 | Mayes | 260—606.5 B |

OTHER REFERENCES

Inorganic Chemistry, vol. 2, pp. 1115–1119, Fein et al., 1963.

JOHN C. BLEUTGE, Primary Examiner

U.S. Cl. X.R.

260—80 P, 606.5 B